Patented June 17, 1952

2,600,953

UNITED STATES PATENT OFFICE 2,600,953

SYNTHETIC POLYMERS FROM HYDROXY AMINO ACIDS

René Aelion, Brooklyn, N. Y., assignor to Organico, Paris, France, a society of France No Drawing. Application April 18, 1949, Serial No. 88,230. In France April 19, 1948

8 Claims. (Cl. 260—78)

This invention relates to new types of synthetic polymers obtained by polycondensation or copolycondensation of amino-alcohols of the type having the general structural formula:

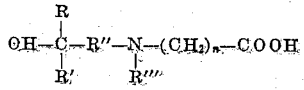

wherein:

R and R' each are a hydrogen atom or a monovalent radical;
R'' is a bivalent radical;
R''' is a hydrogen or a monovalent radical; said radical may for instance also carry an alcohol function and be of the type:

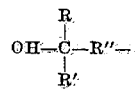

When R''' is hydrogen, n should be equal to or greater than 5. When R''' is a monovalent radical, n may have any desired value.

The hydroxy alkyl group attached to the nitrogen atom in the hydroxy alkyl amines carboxylic acid which provides the new synthetic polymer by polycondensation and copolycondensation is characterized by the formula

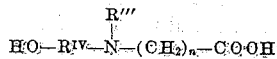

where $R^{IV}$ is an alkylene radical containing at least 2 carbon atoms in a straight chain between its two valences, and n stands for an integer of at least 5 and R''' is hydrogen, alkyl or hydroxyalkyl.

These compounds may be easily obtained by reacting halogenated acids of the type $$X—(CH_2)_n—COOH$$

(wherein X is a halogen) with aminoalcohols of the type

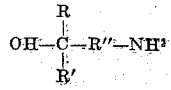

or

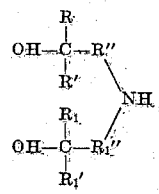

The aminoalcohols used may include mono- or di-ethanolamines and di-propanolamines.

It is known that spinnable or extrudable materials may be obtained by subjecting to polycondensation acid salts resulting from reaction of an aliphatic diacid with aminoalcohols. These acid salts for each of their carboxyl groups contain a hydroxyl or an amino group capable of reacting therewith. In aliphatic acids having an aminoalcohol substituent group in their molecule, as used according to this invention, there is only one carboxyl group for at least two hydroxyl and amino groups capable of reacting therewith.

The polycondensation of such monomers, depending on the conditions in which this polycondensation reaction is conducted, may lead to the formation of linear polycondensation products, or it may lead to polycondensation products having a three-dimensional structure, of the thermosettable type.

Polycondensation of aminoalcohols with elimination of water occurs upon simple heating at atmospheric pressure and preferably in an inert atmosphere. The reaction occurs in several consecutive steps: In a first stage, linear polymers are formed, and in this state, the resulting product remains fusible and soluble in certain solvents; the product is moldable, spinnable, and more generally workable in the plastic state. As the polycondensation reaction proceeds further, the product sets to a gel and hardens to give finally a non-fusible and insoluble product, apparently as a result of the formation of ether-oxide cross-linkages bridging the linear chains. It may prove desirable to add condensation catalysts such, for instance, as small amounts of phosphoric acid and anti-oxygenating products such as hydroquinone.

The said aminoalcohols may also be copolycondensed with other monomers, such for instance as ordinary aminoacids.

Finally, to said aminoalcohols, or to the mixtures thereof with other monomers, diacids or acid-alcohols may be added; in this case, the hardening of the product with the formation of a three-dimensional network probably results from a formation of diester or ester-ether cross-linkages.

The ensuing examples will clearly illustrate the nature and scope of the invention. They relate to products obtained from 11-bromoundecanoic acid and mono- and diethanolamines. Quite similar results are obtained with homologs of mono- and diethanolamine and with other halogenated acids in which the halogen atoms are positioned at the end of the chain.

EXAMPLE I

(a) Preparation of 11-N-Ethanolaminoundecanoic Acid

This acid is prepared by the reaction:

$$Br-(CH_2)_{10}COOH + 2NH_2-CH_2-CH_2OH \rightarrow$$
$$HO-CH_2-CH_2-NH-(CH_2)_{10}-COOH + HBr.NH_2-CH_2-CH_2OH$$

This reaction takes place at ordinary temperature and is strongly exothermic. It is more easy to accomplish than the amination of the bromine derivative, probably because the reactivity of the amine function is stimulated by the presence of the hydroxyl in the $\beta$ position.

The 11-bromo-undecanoic acid is carefully purified by crystallization from petroleum ether to which absorbent clay is added. The product used melts at 50° C.

The brominated derivative and the ethanolamine are then placed in a container, in the ratio of one mole of the first for 4.5 moles of the second. The mass is quickly heated to melt the brominated derivative and forms a clear liquid which, upon strong agitation, sets within a few minutes. The hard product is allowed to stand for several hours, as the reaction proceeds in the solid state. The mass is then washed with chloroform to eliminate traces of unreacted brominated derivative and ethanolamine. It is next filtered and taken up with water at boiling point. 11-N-ethanolaminoundecanoic acid formed dissolves and crystallizes at ordinary temperature. The crude product obtained melts at 129–130° C. The product is obtained in quantitative yield.

The product is then purified by crystallizing it from water or alcohol at the boil. After two crystallization steps, the resulting acid melts at 134° C.

(b) Polycondensation of 11-N-Ethanolaminoundecanoic Acid

This polycondensation reaction was conducted under the usual conditions, at the melting temperature of the mass, first in a pure nitrogen atmosphere, then in a high vacuum. The reaction vessel was heated in a uniform manner in a molten salt bath. Test samples were taken during the reaction and the rate of elimination of water was determined. It was found that the polycondensation product, in the course of its dehydration, undergoes an evolution which may be described as follows.

First stage of polycondensation

A test sample taken at the end of 50 minutes of polycondensation under atmospheric pressure at a temperature of 150° C., or at the end of three hours at 130° C., has the appearance of a grey, slightly sticky or tacky resin, melting point 116° C.

The product is water-sensitive, but is not water-soluble as is the monomer. It is partially soluble in alcohol at the boil, but precipitates out on cooling. It is soluble in benzyl-alcohol and other solvents for usual polyamides. It is insoluble in the usual organic solvents (ether, chloroform, ethyl acetate, and the like).

Second polycondensation stage

This stage corresponds with an elimination of water which already is greater in amount than the theoretical maximum as calculated in terms of the formation of the amide, to wit one mole water per mole 11-N-ethanolamino-undecanoic acid. A test sample taken at the end of 80 minutes polycondensation, under normal pressure and at 160° C. temperature, corresponds with 115% eliminated water. It is accordingly apparent that other reactions than amidification are involved.

The resin now appears in the form of a syrup, of soft consistency at ordinary temperature, and perfectly colorless. Stored in a container, it is found to harden slightly at the end of 5 days.

The product is insoluble in water and not very soluble in alcohol at elevated temperatures.

Third polycondensation stage

This stage, which corresponds with a gelation of the resin, is obtained at the end of 130 minutes of polycondensation under normal pressure at 160° C. temperature, or at the end of 90 minutes in vacuo. The eliminated water now reaches 140% of the theoretical value. The gel is elastic in consistency, infusible up to about 280° C. It is soluble in metacresol at boiling point and remains dissolved therein upon cooling. It is soluble to a small degree in heated benzyl alcohol. The gel swells slightly under the action of propylalcohol. Other solvents, even including those that dissolve the normal polyamides such as formamide, have no action upon the gel.

Fourth polycondensation stage

If dehydration is continued further after the gelifying stage, the eliminated water will at the most attain 150% of its theoretical value, and if the temperature is further elevated up to 250° C., the resulting gel becomes firmer and more elastic. It has a faint smell of formol.

(c) Adipic Acid—11-N-Ethanol-Amino-Undecanoic Acid Copoly-Condensation

In the foregoing example, the carboxyl groups of the aminoacid were insufficient in number to amidify and esterify all of the amine and alcohol groups. Secondary reactions may accordingly occur between the alcohol groups. It is possible to accomplish condensation in the presence of a diacid supplying the requisite number of carboxyl groups to saturate both the alcohol and the amine groups.

By copolycondensating 11-N-ethanolaminoundecanoic acid and adipic acid, in the ratio of 2 moles of the first to one mole of the second, the condensation reaction proceeds as in (b) above, and the resulting gel has the same elastic consistency, but is somewhat harder than in the case of the pure polycondensate. In this case, it is likely that the linear chains are bridged by diester cross-linkages.

(d) Copolycondensation of 11-Aminoundecanoic Acid With 11-N-Ethanolaminoundecanoic Acid The copolymerization reaction is conducted in the usual conditions, the mixture of aminoacids being heated to 230° C. At the end of a few hours' dehydration, the resin sets to a gel. The mechanical characteristics of the gel depend on the respective proportions of the two aminoacids used. This will now be briefly described.

*Resins containing small percentages of N-ethanolamino-11-undecanoic acid (from 1 to 5%)*

Gelation occurs for very low percentages of N-ethanolamino-11-undecanoic acid, if the dehydration is effected under a high vacuum. Gelified resins may be obtained for a molar percentage as low as 1.5% N-ethanolamino-11-undecanoic acid.

Resins of this type are characterised, prior to gelation, by their spinnable thermoplastic condition and a slight elevation of their melting point over that of the polyundecanamide (M. P.=195° C. for instance for a percentage of 2%). Such resins are moldable under heat and pressure. After gelation, the thermoset resin no longer melts but softens and becomes translucent at a temperature of 250° C. It is very difficultly soluble in the solvents of polyundecanamide.

*Resins containing average percentages of N-ethanolamino-11-undecanoic acid (about 5 to 50%)*

These resins still are thermoplastic prior to gelation, but become very difficult to spin above a percentage of about 10%. They are moldable under pressure. The sheets obtained possess good mechanical characteristics. After gelation, such resins become excessively hard, and very resistant to impact. They soften slightly and become translucent at temperatures from 300° C. to 320° C. The resins are insoluble in the solvents for polyundecanamide.

*Resins containing high percentages of N-ethanolamino-11-undecanoic acid (50 to 100%)*

The resins gelify very rapidly. These thermosettable resins possess a high elasticity. The softening temperature is at about 300° C. Insolubility is retained. With very high percentages, the resin has a rather soft consistency.

Copolycondensation reactions similar in character may also be accomplished by adding to the aminoacid and aminoacid-alcohol mixture, an acid-alcohol such as lactic acid in a proportion which is the higher as the proportion of aminoacid-alcohol is itself higher.

EXAMPLE II (a) PREPARATION OF N-DIETHANOL-AMINO-11-UNDECANOIC ACID

This acid is prepared from bromo-11-undecanoic acid and diethanolamine according to the reaction:

Br—(CH$_2$)$_{10}$COOH+2(CH$_2$OH—CH$_2$)$_2$NH→
(CH$_2$OH—CH$_2$)$_2$N—(CH$_2$)$_{10}$COOH+
(CH$_2$OHCH$_2$)$_2$NH.HBr

The bromine substitution is effected by mixing both reagents in a container heated at about 80° for three or four hours, in the ratio of 2 moles amine to one mole of the brominated derivative. Upon cooling, the set mixture is dissolved in absolute alcohol at elevated temperature. Ethyl acetate is added until the liquid becomes turbid. The mixture is then allowed to cool and the aminoacid is thus caused to be precipitated; upon recrystallisation from the ethyl-acetate and absolute alcohol mixture, the product melts at 90–91°. The yield of the reaction varies from about 75 to about 80%.

(b) POLYCONDENSATION OF N-DIETHANOL-AMINO-11-UNDECANOIC ACID

This N-substituted aminoacid behaves like an ordinary hydroxyl-acid. It is more readily decomposable under the influence of temperature than under that of atmospheric oxygen. Its dehydration, which starts at melting temperature, should be continued at a temperature below 180° C. The polycondensation, if it is desired to conduct it until gelation is obtained, should be effected in a very high vacuum (say about 0.10 mm. Hg).

The resin in the non-gelified state is somewhat hard in consistency, nearly white in color. Its melting point is about 62° C. It is soluble in ordinary solvents such as alcohol, at a waterbath temperature. It is insoluble in water.

The gelified resin is slightly tacky. Its consistency is somewhat similar to that of rubber. The usual solvents, such as alcohol, ether and acetone, cause it to swell readily. It is sensitive to water.

In all probability, this condensation first produces a linear polyester which, on further dehydration, probably gives a three dimensional polyester.

(c) COPOLYCONDENSATION OF N-DIETHANOLAMINO-11-UNDECANOIC ACID WITH AMINO-11-UNDECANOIC ACID

A mixture comprising:

| | Percent |
|---|---|
| Amino-11-undecanoic acid | 90 |
| N-diethanol-amino-11-undecanoic acid | 10 | is heated to melting point, occurring at about 180° C. As soon as complete melting has been obtained, the dehydration of the mixture should be continued at a lower temperature to avoid decomposition therein. At the end of four hours of polycondensation, the resulting polymer is gelified.

The resin obtained is opaque. It is insoluble in the usual solvents, as are the copolycondensates obtained from N-ethanolamino-11-undecanoic acid, but its mechanical characteristics are somewhat less satisfactory.

All the resins described above may be used in all the conventionally-known applications of such types of products, including production of plastics, molding powders, thermosetting varnishes, artificial leather, yarn, synthetic horsehair, adhesives, binders, microporous products, etc. They may of course be loaded with the usual filler additions, and pigments may be added to them to obtain any desired ornamental effects.

As a general rule, it is preferable to work them while still in the stage prior to gelation, and if necessary harden them in their final shape by application of heat.

What I claim is:

1. A method for producing a synthetic polymer, which comprises polycondensing by heating an amino-hydroxycarboxylic acid of the formula $$HO-R^{IV}-\overset{R'''}{\underset{|}{N}}-(CH_2)_n-COOH$$

wherein $R^{IV}$ is an alkylene radical containing at least 2 carbon atoms in a straight chain between its two valences, $R'''$ is a monovalent radical selected from the group consisting of hydrogen, alkyl and hydroxyalkyl and $n$ stands for an integer at least equal to 5.

2. A method for producing a synthetic polymer, which comprises polycondensing by heating an amino-hydroxy-carboxylic acid according to claim 1, wherein $R'''$ is a hydroxyalkyl group.

3. A method for producing a synthetic polymer, which comprises polycondensing by heating an amino-hydroxy-carboxylic acid of the formula HO—CH$_2$—CH$_2$—NH—(CH$_2$)$_n$—COOH wherein $n$ stands for an integer at least equal to 5.

4. A synthetic polymer obtained by the method according to claim 3.

5. A method for producing a synthetic polymer, which comprises polycondensing by heating 11-N-monoethanolamino-undecanoic acid.

6. A method for producing a synthetic polymer, which comprises copolycondensing by heating an amino-hydroxy-carboxylic acid according to the formula of claim 1 with an aminocarboxylic acid of the formula $$NH_2-(CH_2)_n-COOH$$

wherein $n$ stands for an integer at least equal to 5.

7. A method according to claim 6, wherein 11-N-monoethanolamino-undecanoic acid is copolycondensed with 11-amino-undecanoic acid.

8. A synthetic polymer obtained by the method according to claim 6.

RENÉ AELION.

REFERENCES CITED

The following references are of record in the file of this patent:

UNITED STATES PATENTS

| Number | Name | Date |
|---|---|---|
| 2,274,831 | Hill | Mar. 3, 1942 |
| 2,279,745 | Stevenson | Apr. 14, 1942 |